March 4, 1947.  P. E. THOMAS  2,416,967
PIPE COUPLING
Filed May 8, 1945
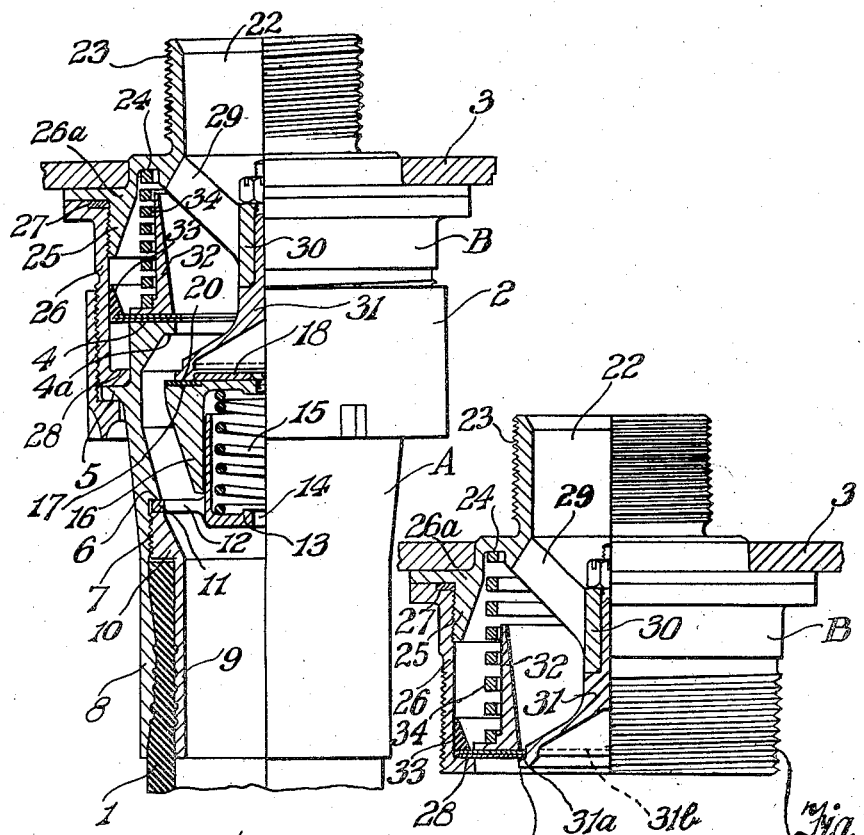
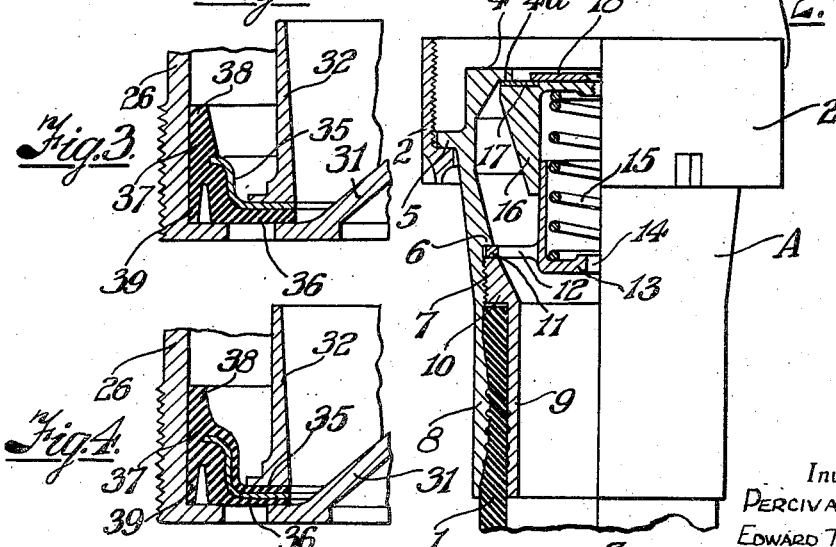
Inventor
PERCIVAL EDWARD THOMAS
By Stevens and Davis
his Attorneys Patented Mar. 4, 1947

2,416,967

UNITED STATES PATENT OFFICE 2,416,967

PIPE COUPLING

Percival Edward Thomas, Worcester Park, England, assignor to Sterling Industries Limited, London, England, a British company Application May 8, 1945, Serial No. 592,563
In Great Britain June 12, 1944

1 Claim. (Cl. 284—19)

This invention relates to improvements in pipe couplings and has for its object to provide an improved construction of pipe coupling that is self sealing at the terminals of both pipes against egress of the fluid carried on disconnection, but on recoupling the sealing devices are displaced to admit of fluid flow. The self sealing devices are constituted by spring loaded mobile valves, one in each coupling part, and which operate to seal in absence of mutual contact.

A further object of the invention is to reduce to a minimum the inclusion of air on recoupling and also to provide the minimum of impedance to fluid flow within the coupling parts when in their connected state.

In application the coupling parts may be disposed each on separate pipe terminals, or one coupling part connected to a fluid containing tank reservoir or the like and the counterpart coupling on pipe terminal connected thereto.

Further, the pipe connecting devices forming part of the coupling may be of a type for application to metallic conduits, or for application to flexible or like non-rigid pipes. In either form the separate coupling parts are allowed to be drawn together by a screwed union nut of normal type, or the mechanical equivalent thereof.

The invention consists in a self sealing bipart pipe coupling characterised by means wherein each said part has a resiliently mounted mobile valve member and a stationary valve seating or seatings, said mobile valve member of each part being arranged to engage its own seating on disconnection but disengage therefrom on coupling and engage the stationary seating of its counterpart.

According to the invention a pipe coupling of the type above referred to is further characterised by annular packing devices, combined with a valve, that are reinforced in a plane parallel to the abutting surfaces of the respective valve parts, but have a resilient circumferential lip or lips, whereby the said combined valve and packing retains the coupling free from leakage in either its connected or disconnected state, and tight to both high and low pressures or vacuum irrespective as to whether the pressure or vacuum exist on the one or the other side of the part sealed.

In construction and according to the invention the two parts of the coupling, herein referred to for the sake of distinction as spigot part A and socket part B are characterised that each valve seating has two separate seatings or valve seat faces, one face for the valve of its own part, and on coupling for fluid flow, one for its counterpart valve. The valve faces that procure a fluid tight joint are of a flexible annular type and in one part with a circumferential lip, and in either case fabricated from material unaffected by oil or hydrocarbon spirit such as synthetic resin or rubber and the pressure spreading reinforcing devices may be employed when there is a tendency for the flexible facing to spew under the continuous thrust of the contact compelling springs. The sealing valves of both coupling parts are arranged to be axially mobile and flexible enough in their construction to accommodate small inaccuracies in the plane of engagement with their seatings. The parts A and B of the coupling may be drawn together by a union cramp nut or kindred device and during the operation of coupling the flat valve surfaces of each part are caused to first abut, and with their seatings when so abutting the union cramping device is threaded home to lock the parts together. In this manner there is no imprisoned air to enter the fluid system on coupling, and fluid flow from interconnection only commences when the union nut is sufficiently threaded to prevent fluid loss.

In order that the invention may be more fully understood reference is made to the accompanying drawings wherein a preferred constructional form is illustrated and wherein—

Fig. 1 is a part sectional elevation of the coupling in its operative condition for fluid flow.

Fig. 2 is a like view as Fig. 1 but the coupling parts are shewn in an uncoupled condition and both pipe terminals sealed.

Fig. 3 shews to an enlarged scale a fragmentary section of the packing device.

Fig. 4 shews in like manner to Fig. 3 a modified form of the said packing device.

Referring to the drawings and to Fig. 1, the lower coupling part A, shewn as mounted on a flexible pipe 1, is drawn by union cramp nut 2 into operative position in relation to coupling part B, the latter as shewn being a fixed entity secured to a bulkhead 3. The coupling part A is a hollow body having ground seating faces 4 and 4a, a circumferential flange 5, an off set shoulder 6, and a threaded shoulder 7 and a segmentally curved skirt 8, adapted to grip the substance of the flexible pipe 1, against the support of a headed spigot tube 9, the head 10 being screwed to engage the threaded shoulder 7. Disposed between the head 10 of spigot 9 and the shoulder 6 is the peripheral ring 11 of the spider 12. The spider 12 carries a spring seating and aligning cup 13 perforate at 14, said cup housing spring 15, the latter taking an abutment against the underside of the mobile valve body 16, the latter being guided in its movement by the walls of cup 13. The said valve 16 is provided with a facing ring 17, the latter being locked in position by a disc 18 screwed to the valve body head 16 or the ring 17 sprung into a groove, the disc 18 being in such case integral with the body of valve 16. The valve facing ring 17 is preferably resilient and made from a vulcanised oil resisting synthetic rubber; said valve face contacts, in position shewn in Fig. 1, with the ground faced seating 20 of cup seating 31 of coupling part B, and in the position shewn in Fig. 2 with the under face 4a of the housing of coupling part A within which part said valve is fitted.

The coupling part B, see Fig. 1, is formed of two parts 26 and 26a. Part 26a consists of a flanged bulkhead spigot 22 externally threaded at 23 for a known type of pipe extension coupling (not shewn) and has a spring socket 24, and a boss 25 screwed externally. The coupling body 26 is threaded to engage the boss 25, a packing 27 intervening to make a fluid tight joint. If high fluid pressure is employed the threads may be discontinued at the base of the screwed connection 25, and the parts spun together. The body 26 has an internally flanged skirt and valve seating 28 operating as a limiting stop by engaging flange 5 of part A when operatively assembled.

Integral with the body part 26a is a spider 29 carrying a perforate boss 30 within which latter is fixedly mounted the cup seating 31, the ground face of which is adapted to engage the face 17 of valve 16. A flanged valve spring guide 32 is mounted concentrically of the coupling's vertical axis, and is adapted to bear upon the upper face of valve and packing member 33, or a metal annulus ring 35, and act as abutment for spring 34, the upper abutment for said spring being the recess 24 in part 26a. The annulus ring 35 may be incorporated in the material of the valve and packing member 33 or superficially applied, and details of this device are further illustrated to an enlarged scale in Figs. 3 and 4.

The valve and packing member 33 consists in the form shewn in Fig. 1, of metallic annular part 35 having a perforate centre, and coated on either side with a resilient synthetic resin or rubber material 36, said coating material being selected according to the nature of the fluid passing in the pipe to be coupled, and is preferably of a nature not affected by oil or hydrocarbon spirit. The rigid metallic annulus 35 is shewn embedded in the resilient material 36 in Figs. 1 and 4 or alternatively the reinforcing material may be exposed and have its resilient coating on one side or as shewn in Fig. 3.

In both forms the resilient material 36 is formed at its circumferential part as a cup shaped entity 37, tapering towards the lip 38 and adapted to engage the inner wall of the cylindrical housing 26.

In order to effect a definite seal against leakage through vacuum or pressure external of the coupling part B the valve and packing member 33 may be made in the form shewn in Figs. 3 and 4, wherein the underpart has a lipped cup 39 formed integrally with the resilient material enabling same also to engage the wall of the cylindrical part 26. This combined valve and packing member therefore seals the coupling part B both above and below the annular seating of the sealing valve. The metallic annulus 35 provides an even spread of the pressure exerted by the spring 34 through the flange of the spring guide 32.

The operation of the invention is as follows:

The coupling part B in the example shewn is the anchored part fixedly attached to the bulkhead 3 and is part of the permanent fluid flow system. When uncoupled as shewn in the upper part of Fig. 2 the spring guide 32 under the force of the spring 34 forces the cup washer valve 33 into contact with the valve seatings 28 and 31a, thus sealing the coupling thereby maintaining the fluid in the pipe and coupling B without loss and without inlet of air. The like operation takes place in coupling part A wherein the mobile resiliently urged valve member 16 is caused to have its face 17 contact with the seating 4a in the uncoupled state.

In Fig. 1 the coupling is shewn with the component parts A and B locked together in operative engagement by the union cramp nut 2. When coupling takes place the seating 4 of coupling body A engages the underside of valve member 33, simultaneously valve face 17 of valve part 16 engages the seating 20 of cup seating 31. A few turns of the nut 2 now causes the respective valves 33 of part B and 16 of part A to leave their contact with their respective seatings 28 and 31a in the case of part B and 4a in respect of part A. This allows fluid to commence to flow through the coupling, and when the cramp nut 2 reaches the end of its permitted travel by forcing flange 5 of part A into contact with the inner flange of 26 part B the operation is complete, and the respective coupling parts A and B appear as shewn in Fig. 1.

In order to achieve immunity from air inclusion at breaking of the coupling or on recoupling the inverted cup shaped cavity of part 31 may be closed with a diaphragm indicated by dotted lines at 31b in Fig. 2 or if weight be not a material factor the cavity may be dispensed with and the part 31 made solid to the valve seating 20.

I claim:

In a self-sealing coupling including a projecting part, a socket part and means for drawing said parts together in telescoping relationship, the improvements that comprise a spring urged valve member in said projecting part, said valve member being provided with a resilient face, a double faced fixed seat in said projecting part, the resilient face of said valve member normally bearing against the under face of said seat to seal said projecting part in its uncoupled position, a fixed valve member in said socket part adapted to engage and depress said spring urged valve member when the parts are drawn together in telescoping relationship, and a spring urged, hollow cylindrical valve seat in said socket part having a resilient face at its lower edge, said socket part having an internal flange, said face of said spring urged valve seat normally bearing on the upper face of said fixed valve member and said flange to seal said socket part in its uncoupled position, the upper face of said fixed seat bearing against the resilient face of and displacing said spring urged seat when the parts are drawn together in telescoping relationship, the abutting relationship of the fixed seat and the spring urged seat defining a seal for an annular passageway around said valve members.

PERCIVAL EDWARD THOMAS.

REFERENCES CITED

The following references are of record in the file of this patent:

UNITED STATES PATENTS

| Number | Name | Date |
| --- | --- | --- |
| 2,319,015 | Speth | May 11, 1943 |
| 2,311,239 | Main et al. | Feb. 16, 1943 |